Patented Mar. 2, 1937

2,072,089

UNITED STATES PATENT OFFICE 2,072,089

METHOD OF OBTAINING AND ISOLATING FINELY DISPERSED SUBSTANCES, POSSESSING AN ELECTRICAL CHARGE, FROM STRONGLY DILUTED SOLUTIONS

Hermann Fink, Munich, Germany

No Drawing. Application June 25, 1934, Serial No. 732,306. In Germany June 26, 1933

4 Claims. (Cl. 210—62)

This invention relates to a method of obtaining and isolating finely dispersed substances, possessing an electrical charge, from strongly diluted solutions by adsorption.

The employment of adsorbents having a selective action is a known method for the production and purification of chemical substances especially those of medium to high molecular weight from dilute solutions.

If large quantities of liquid, containing only small amounts of the substance to be isolated, are to be treated, according to these known methods, the disadvantage arises that difficult and therefore long continued centrifuging is necessary in order to separate the adsorbed substance from the liquid. This difficulty arises particularly when several adsorption processes have to be carried out in sequence.

It is also known to separate the disperse phase from suspensions or emulsions by filtering, and from suspensoid and emulsoid dispersions by the ultra-filter.

In the process according to the invention, the isolation of dissolved substances, possessing an electrical charge, especially those of medium to high molecular weight from large quantities of liquid is effected in a rapid and simple manner by filtering the suitably adjusted solution through filtering layers which either consist of the desired adsorbents or else contain the said adsorbents in suitable quantities and proportions. Mixtures of different adsorbents can also be employed. In order to ensure a sufficiently rapid passage through the filtering layer, and in order also to avoid clogging the filter, a filtering material, which in itself can also be an adsorbent, may be employed with advantage as a frame or carrier for the other adsorbent or adsorbents. An example of such a combination is asbestos and kieselguhr.

The said suitable adjustment of the solution to be filtered is reached by adapting the solution to such a pH value that the solubility or dissociation of the dissolved substance to be isolated is repressed very considerably or the degree of dispersion is lowered. This can be effected by addition of soluble chemicals of basic or acid character.

The filter material employed must consist of or contain adsorbents, the electrical charge sign of which is opposed to that of the substance to be adsorbed. Such a process may be termed "adsorptive filtration".

It has been found that by the process according to the present invention widely different kinds of chemical substances possessing an electrical charge can be recovered even from extremely diluted solutions, especially substances of medium to high molecular weight, and so for example, substances of organic, physiological and pharmacological importance of acid, basic, neutral and amphoteric nature, such for example as colouring matters, alkaloids, hormones, ferments, the active components of drugs and many others.

The present process is thus suitable, particularly for example for the treatment of large quantities of animal fluids such for example as urine, blood serum, spinal fluid and the like, and also for the treatment of extracts and mother lyes, for example in the preparation or recovery of alkaloids, hormones and ferments. The process can also be applied with advantage to the estimation or quantitative determination (analysis) of the pharmacologically active content of drugs, for example drugs containing alkaloids, after preceding extraction and subsequent adsorptive filtration according to the present invention.

Even substances of lower molecular weight and of higher dispersion can be isolated by the process according to the present invention, if their solubility is correspondingly reduced by the addition of suitable substances to the solution.

The dilution of the substance to be isolated can in all these cases be so great that after obtaining the conditions for minimal solubility no separation (e. g. crystallization, flocculence, or coagulation) takes place, because in case of separation the substance could also be separated by methods hitherto known (centrifuging or filtering with the filters hitherto usual).

In cases in which two or more substances to be separated of the above mentioned properties are present together in a solution, a separate successive separation can be carried out, if the minimal solubilities of the individual substances are found to be at sufficiently different reaction conditions. In such cases one of the substances is first brought to minimal solubility and the solution so adjusted "is adsorptively filtered". The filtrate is then brought to minimal solubility of the second substance, or to the minimal solubilities of the other substances in turn and the filtrate or filtrates adsorptively filtered through suitable filter layers.

In following out the present invention it was found that the present process of adsorptive filtration can also be applied in suitable cases to the discovery of chemical bodies, not previously discovered or not yet isolated, and indeed, of bodies occurring naturally in a dissolved or soluble state, as well also as of such dissolved or soluble bodies as have occurred, hitherto unrecognized in artificial reactions for example as by-products. In these cases of the employment of adsorptive filtration it is desirable, according to the invention that the liquid to be examined for hitherto undiscovered substances or bodies should not only be adsorptively filtered in stages with successive adjustment to various stages corresponding to the whole pH range, but that in this adsorptive filtration the liquid should come in contact moreover at each pH stage alternately with a filter material of different charge sign.

Example 1

First of all the following describes the application of the present process to the first successful isolation of natural urine porphyrin, which occurs in very small traces in the urine of healthy men. 300 litres of human urine obtained with sterile precautions are brought, by electrometric titration, to somewhat above (towards the acid side) the iso-electrical point of porphyrin, which is at pH 3.9, so that the porphyrin still possesses minimal solubility but is already positively charged. The urine thus adjusted is then filtered through a layer about a finger thick of a negatively charged filter mass which may consist for example of a mixture of cotton fibres and asbestos. The porphyrin is practically quantitatively precipitated in the filter cake and can then be recovered as a crystallized ester from the filter cake by the methods usual in the chemistry of the colouring matter of blood (extraction with glacial acetic ether, esterification with methyl alcohol hydrochloric acid, recrystallization from chloroform-methylalcohol). Isolation of the natural urine porphyrin has not been achieved previously in spite of many attempts by other investigators with the methods hitherto known of adsorption or by extraction with solvents.

Example 2

100 ccs. of an aqueous solution of cinchonine sulphate of 1 part in 1,000,000 is brought to a weakly alkaline reaction (pH 8.2) by treating it with secondary sodium phosphate. Although the cinchonine has minimal solubility at this reaction, the solution remains clear on account of its very great dilution. The solution is then poured through a Gooch crucible with about 1.5 to 2 gm. of a filter mass consisting of 1 part asbestos and 3 parts kaolin. Almost all the cinchonine is retained by the filter and can be extracted therefrom for example with dilute hydrochloric acid. The hydrochloric acid solution contains the cinchonine, which as is known can be demonstrated by treating with tannin after neutralization. The result is intensive precipitation; this delicate tannin reaction for cinchonine does not occur however when the filtrate is tested.

Example 3

An experiment made with strychnine proceeds quite similarly:—100 ccs. of an aqueous solution of strychnine of 1 part in 1,000,000 is brought to a pH value of about 8.0. The solution remains quite clear. The solution is then poured through a filter mass consisting of 1 part asbestos and 3 parts kaolin. After extraction of the filter mass with dilute nitric acid, etherification of the nitric acid solution and evaporation of the ether the residue shows a very strong reaction with Mandeline's reagent, while a test of the filtrate for strychnine gives a negative result.

Example 4

A strongly diluted hydrochloric acid solution of adrenalin, containing about 0.150 gm. adrenalin per litre, is given a pH value of 7.2 to 7.3. After filtration of this solution through a filter formed of asbestos and kaolin no adrenalin can be detected in the filtrate with the delicate nitrite reaction.

The separation of ferments can be performed in a manner similar to the preceding example, where the possibility of separating hormones is shown.

Example 5

A greatly diluted clear solution of metastannic acid hydrosol, prepared according to W. Ostwald (Kleines Praktikum der Kolloidchemie 1921, p. 14) is given a pH value of about 7.5 to 8 and filtered through an asbestos-kaolin filter. An almost quantitative adsorption of the highly dispersed colloidal phase takes place. The metastannic acid can be recovered from the filter mass by means of concentrated hydrochloric acid.

What I claim is:

1. A method to obtain and isolate from highly diluted solutions finely dispersed substances having solubility and dissociation characteristics being variable with the pH value of the solution, which substances in small amounts produce highly physiological effects and possess an electrical charge, when brought to the point of minimum solubility and dissociation, and consist of one of the following groups as alkaloids, hormones or ferments, comprising said solutions being adjusted to a pH value corresponding to the minimum of solubility and dissociation of said substances, said solutions being then passed through a filter containing adsorbents, said adsorbents possessing an electrical charge sign opposed to the electrical charge sign of the substances to be isolated.

2. A method to obtain and isolate from highly diluted solutions finely dispersed alkaloids having solubility and dissociation characteristics being variable with the pH value of the solution and possessing an electrical charge when brought to the point of minimum solubility and dissociation, comprising said solutions being adjusted to a pH value corresponding to the minimum of solubility and dissociation of said alkaloids, said solutions being then passed through a filter containing adsorbents, said adsorbents possessing an electrical charge sign opposed to the electrical charge sign of the alkaloids to be isolated.

3. A method to obtain and isolate from highly diluted solutions finely dispersed hormones having solubility and dissociation characteristics being variable with the pH value of the solution and possessing an electrical charge when brought to the point of minimum solubility and dissociation, comprising said solutions being adjusted to a pH value corresponding to the minimum of solubility and dissociation of said hormones, said solutions being then passed through a filter containing adsorbents, said adsorbents possessing an electrical charge sign opposed to the electrical charge sign of the hormones to be isolated.

4. A method to obtain and isolate from highly diluted solutions finely dispersed ferments having solubility and dissociation characteristics being variable with the pH value of the solution and possessing an electrical charge when brought to the point of minimum solubility and dissociation, comprising said solutions being adjusted to a pH value corresponding to the minimum of solubility and dissociation of said ferments, said solutions being then passed through a filter containing adsorbents, said adsorbents possessing an electrical charge sign opposed to the electrical charge sign of the ferments to be isolated.

HERMANN FINK.